(12) United States Patent
Yoneda et al.

(10) Patent No.: US 9,742,239 B2
(45) Date of Patent: Aug. 22, 2017

(54) SPINDLE MOTOR AND DISK DRIVE APPARATUS

(71) Applicant: Nidec Corporation, Kyoto (JP)

(72) Inventors: Tomohiro Yoneda, Kyoto (JP); Hiroshi Kobayashi, Kyoto (JP); Masanobu Taki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 350 days.

(21) Appl. No.: 14/718,392

(22) Filed: May 21, 2015

(65) Prior Publication Data

US 2016/0164365 A1 Jun. 9, 2016

Related U.S. Application Data

(60) Provisional application No. 62/127,868, filed on Mar. 4, 2015.

(30) Foreign Application Priority Data

Dec. 4, 2014 (JP) .................................. 2014-245864
Feb. 25, 2015 (JP) .................................. 2015-035008

(51) Int. Cl.
*H02K 11/00* (2016.01)
*H02K 5/10* (2006.01)
*H02K 5/22* (2006.01)
*H02K 11/33* (2016.01)

(52) U.S. Cl.
CPC ................ *H02K 5/10* (2013.01); *H02K 5/22* (2013.01); *H02K 11/33* (2016.01)

(58) Field of Classification Search
CPC ............... H02K 3/28; H02K 5/10; H02K 5/22

USPC .............................. 310/71, 43, 90; 360/99.08
See application file for complete search history.

(56) References Cited

U.S. PATENT DOCUMENTS

| 7,105,963 | B2 * | 9/2006 | Ito ........................ | H02K 3/522 310/67 R |
| 8,304,945 | B2 * | 11/2012 | Yawata ................ | H02K 5/225 310/43 |
| 8,400,729 | B1 | 3/2013 | Watanabe | |
| 8,665,557 | B1 * | 3/2014 | Matsumoto ........ | G11B 19/2009 360/99.08 |
| 8,675,305 | B2 | 3/2014 | Watanabe et al. | |
| 8,908,324 | B1 | 12/2014 | Taki et al. | |

(Continued)

FOREIGN PATENT DOCUMENTS

JP 2012-151940 A 8/2012

OTHER PUBLICATIONS

Yoneda et al.; "Spindle Motor and Disk Drive Apparatus"; U.S. Appl. No. 14/718,387, filed May 21, 2015.

*Primary Examiner* — Hanh Nguyen
(74) *Attorney, Agent, or Firm* — Keating & Bennett, LLP

(57) ABSTRACT

A base portion made of a metal includes an upper surface, a lower surface, and a base portion through hole. An insulation sheet portion is located on the lower surface, and covers at least a portion of the base portion through hole. A lead wire is in contact with the insulation sheet portion. A spindle motor includes a first sealant located in the base portion through hole, and a second sealant which covers at least a portion of the base portion through hole. The first sealant has a coefficient of linear expansion greater than a coefficient of linear expansion of the base portion and smaller than a coefficient of linear expansion of the second sealant.

15 Claims, 12 Drawing Sheets

(56) References Cited

U.S. PATENT DOCUMENTS

| | | |
|---|---|---|
| 8,964,329 B2 | 2/2015 | Taki et al. |
| 2008/0218010 A1 | 9/2008 | Hino et al. |
| 2009/0316299 A1 | 12/2009 | Tashiro et al. |
| 2010/0231068 A1* | 9/2010 | Yamazaki .............. H02K 3/522 310/71 |
| 2011/0122530 A1* | 5/2011 | Sekii ....................... H02K 3/50 360/99.08 |
| 2012/0075746 A1 | 3/2012 | Yoneda et al. |
| 2012/0113546 A1 | 5/2012 | Sugi et al. |
| 2012/0182645 A1 | 7/2012 | Kurokawa et al. |
| 2013/0006946 A1 | 1/2013 | Prahlad et al. |
| 2013/0031773 A1 | 2/2013 | Matsuyama et al. |
| 2013/0113314 A1* | 5/2013 | Lim ...................... H02K 5/225 310/71 |
| 2013/0234550 A1 | 9/2013 | Yamazaki et al. |
| 2014/0042844 A1* | 2/2014 | Sato ...................... H02K 5/225 310/71 |
| 2015/0022919 A1 | 1/2015 | Matsuyama et al. |

\* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A disk drive apparatus, such as, for example, a hard disk drive, includes a spindle motor arranged to rotate a recording disk. A base of a spindle motor described in JP-A 2012-151940 includes a base draw-out hole. A lead wire from a coil passes through the base draw-out hole. The lead wire is soldered to a wiring member arranged on a lower surface of the base.

If the lead wire obliquely passes through the base draw-out hole, the lead wire is brought into contact with a hole edge of the base draw-out hole as illustrated in FIG. 3 of JP-A 2012-151940. If the lead wire is brought into contact with the hole edge, an insulating coating of the lead wire may be damaged. Damage to the coating of the lead wire may lead to defective insulation due to a portion of the coating being stripped off. Moreover, the lead wire, with a portion of the coating being stripped off, and the base may become electrically connected with each other, and a short circuit may occur.

In addition, gaps are defined between the lead wire and the base draw-out hole, and between the lead wire and the wiring member. When such a gap exists, gas may enter or exit from between an interior space of the disk drive apparatus and a space outside of the disk drive apparatus through the gap.

SUMMARY OF THE INVENTION

A spindle motor according to a preferred embodiment of the present invention includes a rotor portion including a rotor magnet, a bearing portion, a base portion made of a metal, a stator portion, a circuit board, an insulation sheet portion, a first sealant, and a second sealant. The bearing portion is configured to support the rotor portion such that the rotor portion is rotatable about a central axis extending in a vertical direction. The base portion includes an upper surface, a lower surface, and a base portion through hole passing therethrough from the upper surface to the lower surface. The stator portion is located on the upper surface. The stator portion includes coils positioned opposite to the rotor magnet with a gap intervening therebetween. The circuit board is provided on the lower surface.

The coils include a lead wire drawn out from above the upper surface downwardly of the lower surface through the base portion through hole. The circuit board includes a land portion to which the lead wire is connected. The insulation sheet portion is located on the lower surface, covers at least a portion of the base portion through hole. The lead wire contacts the insulation sheet portion. The first sealant is provided in the base portion through hole. The second sealant covers at least a portion of the base portion through hole. The first sealant is has a coefficient of linear expansion greater than a coefficient of linear expansion of the base portion and smaller than a coefficient of linear expansion of the second sealant.

According to the above preferred embodiment of the present invention, the likelihood that the lead wire will make contact with an inner wall surface of the base portion which defines the base portion through hole is significantly reduced or prevented. According to the above preferred embodiment of the present invention, entering and exiting of gas through the base portion through hole is prevented. A spindle motor and a disk drive apparatus according to preferred embodiments of the present invention are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, with reference to the accompanying drawings, preferred embodiments of the present invention will be described below. Note that the scope of the present invention is not limited to the preferred embodiments described below, but includes any modification thereof within the scope of the technical ideas of the present invention. Also note that dimensions, scales, numbers, and so on of members or portions illustrated in the following drawings may differ from those of actual members or portions, for the sake of easier understanding of the members or portions.

Figure 1:
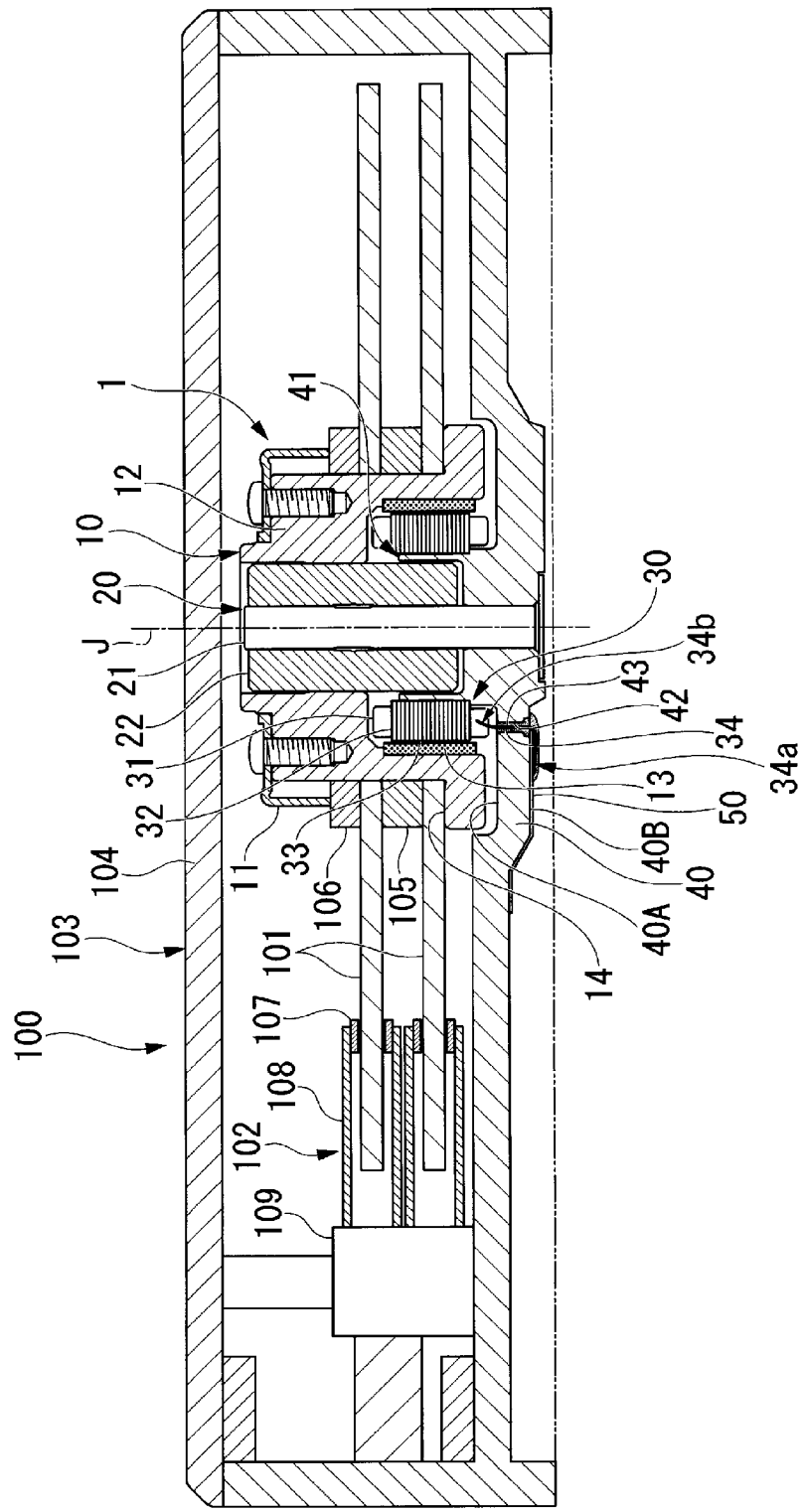
FIG. 1 is a vertical cross-sectional view illustrating a disk drive apparatus according to a preferred embodiment of the present invention.

FIG. 1 is a vertical cross-sectional view illustrating a disk drive apparatus 100 including a spindle motor 1 according to a preferred embodiment of the present invention.

The disk drive apparatus 100 is a hard disk drive. The disk drive apparatus 100 preferably includes the spindle motor 1, disks 101, and an access portion 102. The spindle motor 1 is arranged to rotate the disks 101, on which information is recorded, about a central axis J. The access portion 102 performs at least one of reading and writing of information from or to the disks 101.

The disk drive apparatus 100 includes a housing 103. The housing 103 preferably includes a base portion 40 of the spindle motor 1, and a cover member 104. The cover member 104 is fitted to an opening of the base portion 40 to define the housing 103. The disks 101 and the access portion 102 are accommodated in the housing 103. An interior space of the housing 103 is preferably filled with, for example, a helium gas. Note that the interior space of the housing 103 may alternatively be filled with a hydrogen gas, air, or the like.

The disk drive apparatus 100 includes the plurality of disks 101. The disk drive apparatus 100 includes a spacer 105 arranged between the disks 101. The plurality of disks 101 are supported by the spindle motor 1. More specifically, the plurality of disks 101 are supported by a rotor portion 10 of the spindle motor 1. The rotor portion 10 includes a clamp member 11 configured and located to support the plurality of disks 101. The disk drive apparatus 100 includes a spacer 106 between the clamp member 11 and the disks 101. The plurality of disks 101 are configured to rotate about the central axis J together with the rotor portion 10.

The access portion 102 preferably includes heads 107, arms 108, and a head actuator mechanism 109. Each of the heads 107 is in close proximity to a surface of one of the disks 101 to magnetically perform at least one of the reading and the writing of information. Each head 107 is supported by an associated one of the arms 108. Each arm 108 is supported by the head actuator mechanism 109.

The spindle motor 1 preferably includes the rotor portion 10, a bearing portion 20, a stator portion 30, the base portion 40, a circuit board 50, and an insulation sheet portion 52. The rotor portion 10 preferably includes the clamp member 11, a rotor hub 12, and a rotor magnet 13.

The bearing portion 20 is configured to support the rotor portion 10 such that the rotor portion 10 is rotatable about the central axis J, which extends in a vertical direction. The bearing portion 20 preferably includes a shaft 21 and a sleeve 22. The shaft 21 is fixed to the base portion 40. The shaft 21 and the sleeve 22 are located opposite to each other with a gap therebetween. A fluid, such as, for example, a lubricating oil or a gas, is provided in the gap.

The stator portion 30 preferably includes coils 31 and a stator core 32. Each coil 31 is located opposite to the rotor magnet 13 with a gap therebetween. The stator portion 30 includes the plurality of coils 31. The plurality of coils 31 are supported by the stator core 32. The stator core 32 is preferably a laminated structure defined by laminated magnetic bodies. The stator core 32 includes salient poles 33 each of which projects outwardly. One of the coils 31 is wound around each of the plurality of salient poles 33.

The base portion 40 preferably includes an upper surface 40A, a lower surface 40B, and base portion through holes 42. The upper surface 40A is a surface facing an inside of the housing 103. The base portion 40 is preferably, for example, molded by casting. The base portion 40 is preferably an aluminum die-casting. However, the base portion 40 may be made of any other desirable material and formed using any other desirable manufacturing method. The base portion 40 includes a stator support portion 41. The stator support portion 41 is provided on the upper surface 40A of the base portion 40. The stator support portion 41 is preferably in the shape of, for example, a tube, a polygon, or the like. The stator core 32 is located outside of the stator support portion 41.

Each base portion through hole 42 passes through the base portion 40 from the upper surface 40A to the lower surface 40B. The lower surface 40B is a surface facing an outside of the housing 103. Each base portion through hole 42 preferably extends parallel or substantially parallel to the central axis J. Lead wires 34 from the coils 31 pass through the base portion through holes 42. The spindle motor 1 includes a sealant 43. The sealant 43 fills a gap between each base portion through hole 42 and the lead wire 34. The sealant 43 is preferably an adhesive, for example. The circuit board 50 is provided on the lower surface 40B of the base portion 40. The circuit board 50 is connected with the lead wires 34, which are drawn out below the lower surface 40B through the base portion through holes 42.

Figure 2:
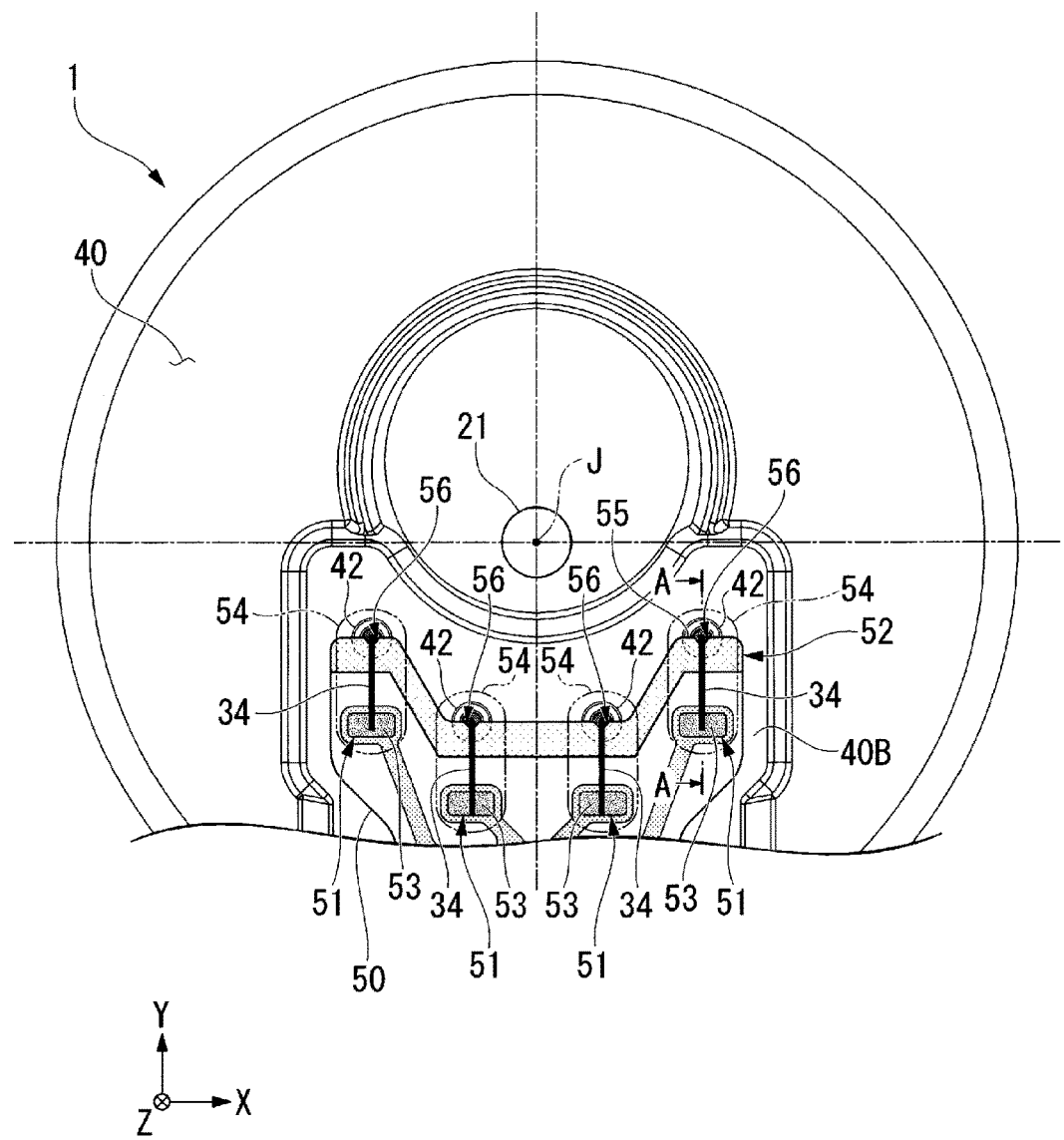
FIG. 2 is a bottom view illustrating a base portion according to a preferred embodiment of the present invention.
Figure 3:
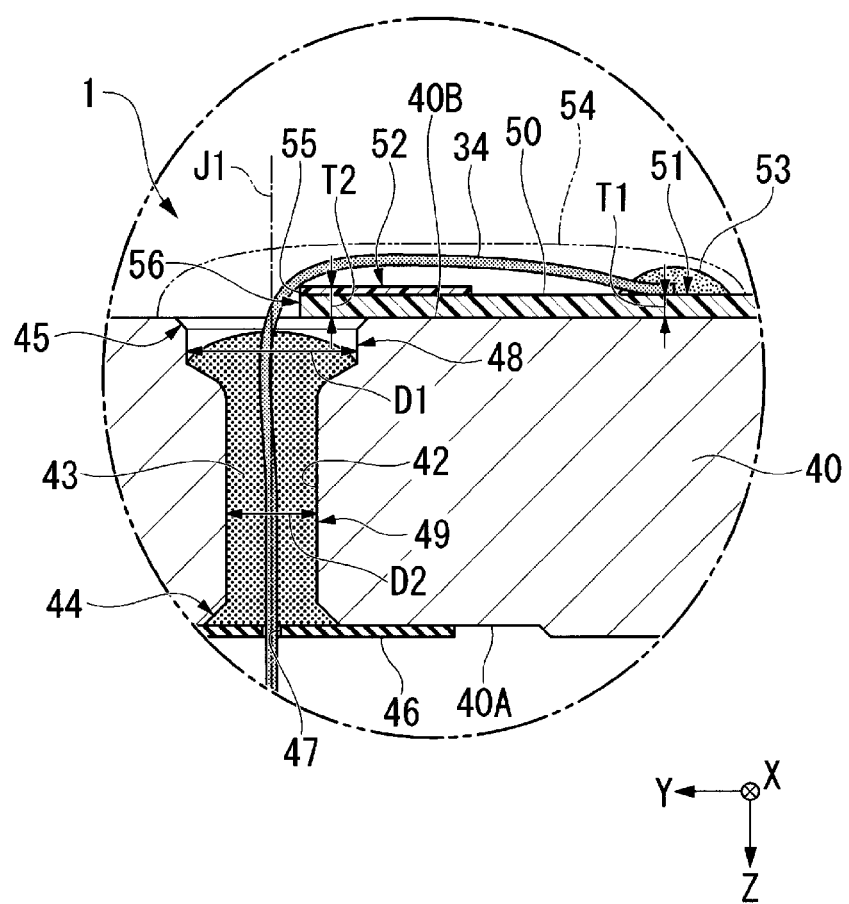
FIG. 3 is a cross-sectional view taken along line A-A in FIG. 2.

FIG. 2 is a bottom view illustrating the base portion 40 according to a preferred embodiment of the present invention. FIG. 3 is a cross-sectional view taken along line A-A in FIG. 2.

In the following drawings, an xyz coordinate system is shown appropriately as a three-dimensional orthogonal coordinate system. In the xyz coordinate system, a z-axis direction is assumed to be a direction parallel to the central axis J extending in a vertical direction in FIG. 1. A y-axis direction is assumed to be a direction perpendicular to a z-axis and parallel to a direction in which each lead wire 34 is drawn in FIG. 2. An x-axis direction is assumed to be a direction perpendicular to both the z-axis and a y-axis. Note that the wording "parallel direction" as used herein comprehends both parallel and substantially parallel directions. Also note that the wording "perpendicular" as used herein comprehends both "perpendicular" and "substantially perpendicular".

Also note that, in the following description, a positive side (i.e., a +z side) in the z-axis direction will be referred to as an "upper side", and a negative side (i.e., a −z side) in the z-axis direction will be referred to as a "lower side". It should be noted, however, that the above definitions of the vertical direction and the upper and lower sides are not meant to indicate relative positions and/or directions of different members or portions when those members or portions are actually installed in a device. Also note that, in the following description, the relative positions of different members or portions and/or positions of those members or portions will be defined based on a central axis J1 which passes through a center of the base portion through hole 42 illustrated in FIG. 3. Unless otherwise specified, a direction parallel to the central axis J1 (i.e., the z-axis direction) will be simply referred to by the term "axial direction", "axial", or "axially", radial directions centered on the central axis J1 will be simply referred to by the term "radial direction", "radial", or "radially", and a circumferential direction about the central axis J1 will be simply referred to by the term "circumferential direction", "circumferential", or "circumferentially".

Referring to FIG. 2, the base portion 40 includes the plurality of base portion through holes 42. The number of base portion through holes 42 included in the base portion 40 is preferably four. The coils 31 include the plurality of lead wires 34. The number of lead wires 34 included in the coils 31 is preferably four. One of the plurality of lead wires 34 is passed through each of the plurality of base portion through holes 42. In other words, one of the lead wires 34 is passed through each one of the base portion through holes 42. The size of each base portion through hole 42 can be reduced to a size which allows only one of the lead wires 34 to pass through the base portion through hole 42, to achieve improved airtightness. In addition, since two or more of the lead wires 34 are not passed through each base portion through hole 42, a failure in filling of the sealant 43 due to a contact of two or more of the lead wires 34 is prevented. The coils 31 are preferably defined by three coil groups. The three coil groups are a U phase group, a V phase group, and a W phase group, respectively. Note that the number of base portion through holes 42 is not limited to four, but may alternatively be one, two, three, or more than four. Also note that the number of lead wires 34 is not limited to four, but may alternatively be one, two, three, or more than four.

In each of the three coil groups, one conducting wire preferably defines two or more of the coils 31. The conducting wire is preferably an enameled wire including an insulating coating. One end portion of each of the three conducting wires of the three coil groups is drawn out as one of the lead wires 34. Meanwhile, opposite end portions of the three conducting wires of the three coil groups are twisted together and drawn out as a single common wire. Hereinafter, the common wire will also be referred to as one of the lead wires 34. Thus, the four lead wires 34 are drawn out of the base portion 40.

The circuit board 50 is preferably a flexible circuit board. The circuit board 50 is fixed to the lower surface 40B of the base portion 40. The circuit board 50 includes land portions 51 to which the lead wires 34 are connected. Each land portion 51 is preferably provided at a position spaced away from a corresponding one of the base portion through holes 42 in a radial direction (specifically, the y-axis direction). The land portion 51 is connected with the lead wire 34 which is drawn out from above the upper surface 40A downwardly of the lower surface 40B through the base portion through hole 42.

The circuit board 50 includes the plurality of land portions 51. The number of land portions 51 included in the circuit board 50 is preferably four, for example. One of the plurality of lead wires 34 is connected to each of the plurality of land portions 51. In other words, one of the lead wires 34 is connected to each one of the land portions 51. Each land portion 51 preferably is rectangular or substantially rectangular, including short sides extending in the y-axis direction and long sides extending in the x-axis direction. The lead wire 34 is connected to the land portion 51 through a solder 53. The lead wire 34, the land portion 51, and the solder 53 are preferably covered with a molding member 54. The molding member 54 is preferably made of a resin. The molding member 54 is, for example, a thermosetting adhesive. Note that the molding member 54 may not necessarily be an adhesive, and may be, for example, a sheet-shaped portion or a resin material which is not an adhesive.

Referring to FIG. 3, each base portion through hole 42 preferably includes an upper opening portion 44 and a lower opening portion 45. The upper opening portion 44 opens on the upper surface 40A of the base portion 40. The lower opening portion 45 opens on the lower surface 40B of the base portion 40. The upper opening portion 44 is preferably circular or substantially circular in a plan view. An inner wall surface of the base portion 40 which defines the upper opening portion 44 is preferably chamfered. Accordingly, the inner wall surface of the base portion 40 which defines the upper opening portion 44 is slanted to gradually decrease in inside diameter as it extends away from the upper surface 40A toward the lower surface 40B in an axial direction. Note that the inner wall surface of the base portion 40 which defines the upper opening portion 44 will be hereinafter referred to as an inner wall surface of the upper opening portion 44. The lower opening portion 45 preferably is circular or substantially circular in a plan view. An inner wall surface of the base portion 40 which defines the lower opening portion 45 is chamfered. Accordingly, the inner wall surface of the base portion 40 which defines the lower opening portion 45 is slanted to gradually decrease in inside diameter as it extends away from the lower surface 40B toward the upper surface 40A in the axial direction. Note that the inner wall surface of the base portion 40 which defines the lower opening portion 45 will be hereinafter referred to as an inner wall surface of the lower opening portion 45.

Referring to FIG. 3, an opening area of the lower opening portion 45 is greater than an opening area of the upper opening portion 44. An insulation sheet guide 46 is provided on the upper surface 40A of the base portion 40. The insulation sheet guide 46 is configured to position the lead wire 34 which is passed through the upper opening portion 44 at the upper surface 40A of the base portion 40. The insulation sheet guide 46 covers at least a portion of the upper opening portion 44. The insulation sheet guide 46 includes a guide through hole 47. The guide through hole 47 overlaps with the upper opening portion 44 in a plan view. Note that a lower surface of the insulation sheet guide 46 may be fixed to the upper surface 40A of the base portion 40 through an adhesive layer.

An opening area of the guide through hole 47 is greater than a cross-sectional area of the lead wire 34. Thus, the lead wire 34 is able to pass through the guide through hole 47. In addition, the opening area of the guide through hole 47 is smaller than the opening area of the upper opening portion 44. Accordingly, the guide through hole 47 is not in contact with the inner wall surface of the upper opening portion 44. Thus, the likelihood that the insulating coating of the lead wire 34 will be damaged is significantly reduced or prevented. Moreover, even if the insulating coating of the lead wire 34 is damaged, the lead wire 34 does not contact the inner wall surface of the upper opening portion 44. Therefore, a short circuit due to an electrical connection between the lead wire 34 and the inner wall surface of the upper opening portion 44 is prevented.

The insulation sheet guide 46 is preferably made of a resin. More specifically, the insulation sheet guide 46 is preferably thermoplastic. Polyethylene terephthalate (PET), polyamide (PA), polybutylene terephthalate (PBT), polyphenylene sulfide (PPS), or the like, for example, is preferably used for the insulation sheet guide 46. The resin used for the insulation sheet guide 46 preferably has a melting point lower than a melting point of a metal of which the base portion 40 is made. After the insulation sheet guide 46 is provided on the upper surface 40A of the base portion 40, the guide through hole 47 is defined by fusion through light irradiation with a xenon lamp or the like.

Therefore, even when the insulation sheet guide 46 is not positioned with high accuracy, the guide through hole 47 is able to be provided at a position overlapping with the upper opening portion 44 with high accuracy. Use of the insulation sheet guide 46 contributes to reducing the opening area of the upper opening portion 44 and an area of the base portion through hole 42 when compared to, for example, the case where a cylindrical insulating bushing is located in the base portion through hole 42. Accordingly, the likelihood that the helium gas provided in the interior space of the housing 103 will leak out of the housing 103 is reduced.

The base portion through hole 42 includes a first opening portion 48 and a second opening portion 49 between the lower opening portion 45 and the upper opening portion 44. The first opening portion 48 is in communication with the lower opening portion 45. In other words, the first opening portion 48 is located above (i.e., on the +z side of) the lower opening portion 45. The second opening portion 49 is in communication with the first opening portion 48. In other words, the second opening portion 49 is located above (i.e., on the +z side of) the first opening portion 48. The upper opening portion 44 is in communication with the second opening portion 49. In other words, the upper opening portion 44 is located above (i.e., on the +z side of) the second opening portion 49.

An inner wall surface of the base portion 40 which defines each base portion through hole 42 is preferably tubular. In addition, an inner wall surface of the base portion 40 which defines the first opening portion 48 is preferably tubular. The inner wall surface of the base portion 40 which defines the first opening portion 48 will be hereinafter referred to as an inner wall surface of the first opening portion 48. The first opening portion 48 has a first inside diameter D1. An inner wall surface of the base portion 40 which defines the second opening portion 49 is preferably tubular. The inner wall surface of the base portion 40 which defines the second opening portion 49 will be hereinafter referred to as an inner wall surface of the second opening portion 49. The second opening portion 49 preferably has a second inside diameter D2 smaller than the first inside diameter D1. The second inside diameter D2 corresponds to the smallest inside diameter of the base portion through hole 42. The gap between the base portion through hole 42 and the lead wire 34 is filled with the sealant 43 at least at the second opening portion 49. The sealant 43 is preferably made of a resin. The sealant 43 is, for example, a thermosetting adhesive. Note that the sealant 43 may not necessarily be an adhesive, and may be, for example, a resin material which is not an adhesive.

Since the base portion through hole 42 includes the second opening portion 49, which has an inside diameter smaller than that of the first opening portion 48, which is in communication with the lower opening portion 45, an improvement in airtightness is achieved. In addition, since the first opening portion 48 has an inside diameter greater than that of the second opening portion 49, the first opening portion 48 defines and functions as a buffer to accommodate an extra portion of the sealant 43 when the sealant 43 is injected into the base portion through hole 42.

Furthermore, since the gap between the base portion through hole 42 and the lead wire 34 is sealed with the sealant 43, the airtightness is improved. Furthermore, the sealant 43 provided in the gap between the base portion through hole 42 and the lead wire 34 contributes to significantly reducing or preventing the likelihood that the lead wire 34 will make contact with an inner wall surface of the base portion through hole 42.

Referring to FIG. 3, the insulation sheet portion 52 is provided on the lower surface 40B of the base portion 40. The insulation sheet portion 52 covers at least a portion of each base portion through hole 42. Each lead wire 34 contacts the insulation sheet portion 52. An edge 55 of the insulation sheet portion 52 which covers at least a portion of each base portion through hole 42 preferably overlaps with the base portion through hole 42 in a plan view. The edge 55 will be hereinafter referred to as the edge 55 of the insulation sheet portion 52. The edge 55 of the insulation sheet portion 52 is positioned radially inward of the base portion through hole 42. More specifically, the edge 55 of the insulation sheet portion 52 is positioned radially inward of the inner wall surface of the second opening portion 49.

The edge 55 of the insulation sheet portion 52 is located radially outward of (i.e., on a −y side of) a center of the base portion through hole 42. Note that the edge 55 of the insulation sheet portion 52 may alternatively be located at the same or substantially the same position as that of the center of the base portion through hole 42. The lead wire 34, which makes contact with the edge 55 of the insulation sheet portion 52, is drawn out along the central axis J1 of the base portion through hole 42. Accordingly, the lead wire 34 is able to be drawn out in a direction parallel to the central axis J1 without allowing the lead wire 34 to make contact with the inner wall surface of the base portion through hole 42.

Referring to FIG. 2, the insulation sheet portion 52 covers at least a portion of each of the plurality of base portion through holes 42. That is, the edge 55 of the insulation sheet portion 52 overlaps with each of the plurality of base portion through holes 42 in a plan view. Referring to FIG. 3, the insulation sheet portion 52 preferably has a thickness T2 greater than a diameter of the lead wire 34. More specifically, the edge 55 of the insulation sheet portion 52 has a thickness greater than the diameter of the lead wire 34. Thus, a contact of the lead wire 34 with the edge 55 does not easily cause a bending of the insulation sheet portion 52. This contributes to maintaining a uniform distance between the lead wire 34, which is pulled radially, and the inner wall surface of the base portion through hole 42. This in turn contributes to significantly reducing or preventing the likelihood that the lead wire 34 from one of the coils 31, which is passed through the base portion through hole 42, will make contact with the inner wall surface of the base portion through hole 42. The thickness T2 of the insulation sheet portion 52 is preferably greater than a thickness T1 of the land portion 51.

Figure 4:
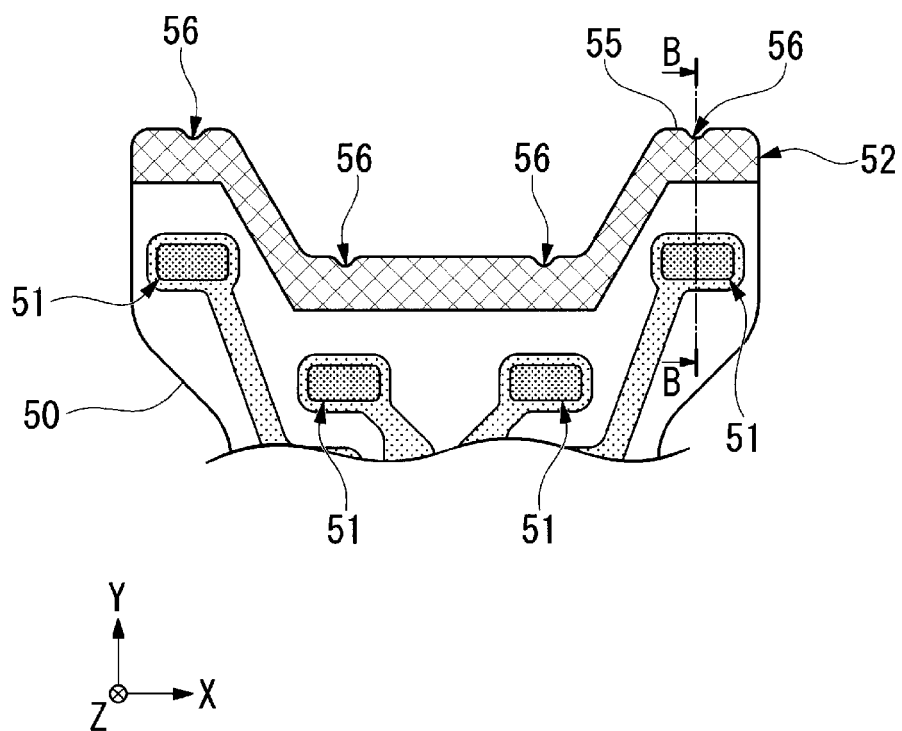
FIG. 4 is a bottom view illustrating a circuit board according to a preferred embodiment of the present invention.

FIG. 4 is a bottom view illustrating the circuit board 50 according to a preferred embodiment of the present invention.

Referring to FIG. 4, the insulation sheet portion 52 is a portion of the circuit board 50. The edge 55 of the insulation sheet portion 52 preferably includes cuts 56 each of which is recessed radially outward (i.e., to the −y side). Preferably, each cut 56 is substantially in the shape of a circular arc in a plan view. A radius of the cut 56 is greater than a radius of the lead wire 34. The radius of the cut 56 is smaller than a radius of the lower opening portion 45. The edge 55 of the insulation sheet portion 52 includes a plurality of such cuts 56. The number of cuts 56 included in the edge 55 of the insulation sheet portion 52 is preferably four.

Referring to FIG. 3, each lead wire 34 contacts an inner edge portion of the insulation sheet portion 52 which defines a corresponding one of the cuts 56. The inner edge portion of the insulation sheet portion 52 which defines each cut 56 will be hereinafter referred to as an inner edge portion of the cut 56. The inner edge portion of the cut 56 includes both a portion of an end surface of the insulation sheet portion 52 and an edge of the portion of the end surface of the insulation sheet portion 52. In other words, the inner edge portion of the cut 56 includes both a portion of the end surface which is in the shape of a circular arc and which faces a radial center of the cut 56, and an edge of the portion of the end surface which extends perpendicularly or substantially perpendicularly to the axial direction. Referring to FIG. 2, one of the plurality of lead wires 34 contacts the inner edge portion of each of the plurality of cuts 56. In other words, one of the lead wires 34 contacts the inner edge portion of each one of the cuts 56.

A contact of the lead wire 34 with the inner edge portion of the cut 56 contributes to preventing the lead wire 34 from moving in a radial direction (specifically, in the x-axis direction) with respect to the edge 55 of the insulation sheet portion 52. Accordingly, the lead wire 34, which is drawn out below the lower surface 40B of the base portion 40, is positioned accurately with respect to the base portion through hole 42. Therefore, the lead wire 34 is accurately positioned in the base portion through hole 42. Since the lead wire 34 is able to be drawn out in the direction parallel or substantially parallel to the central axis J1 from the base portion through hole 42 to the lower opening portion 45, the likelihood that the lead wire 34 will make contact with the inner wall surface of the base portion through hole 42 is significantly reduced or prevented.

Figure 5:
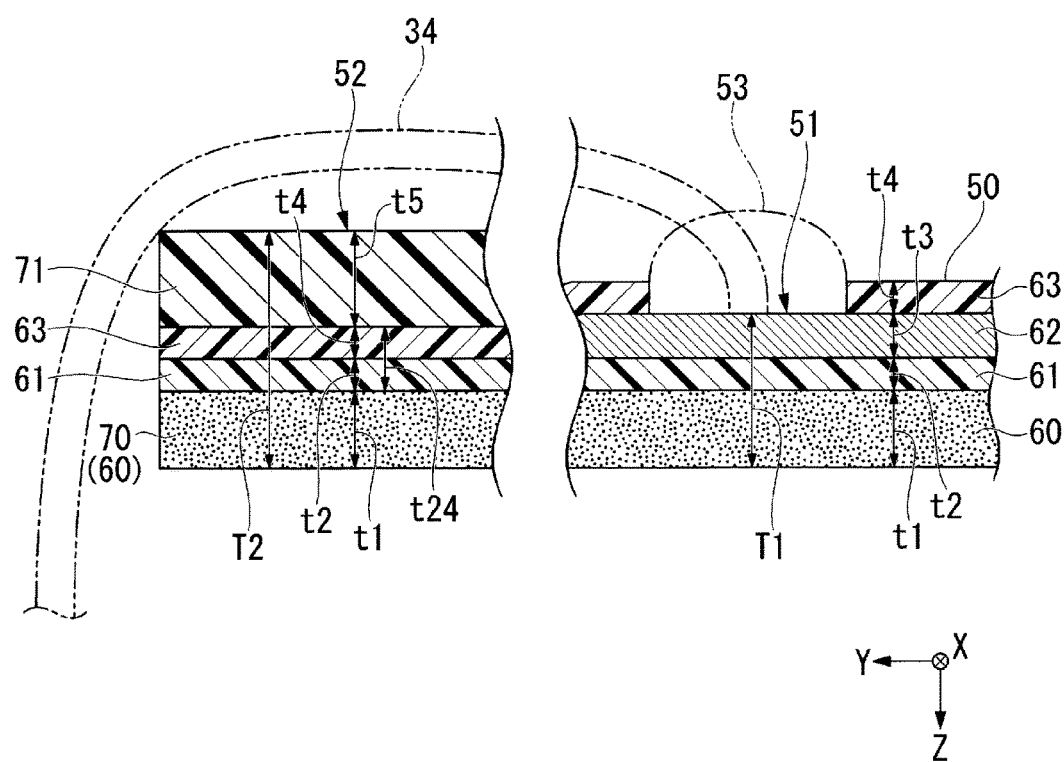
FIG. 5 is a cross-sectional view taken along line B-B in FIG. 4.

FIG. 5 is a cross-sectional view taken along line B-B in FIG. 4.

As illustrated in FIG. 5, the circuit board 50 preferably includes a board adhesive layer 60, a base film layer 61, a copper foil layer 62, and a cover film layer 63. The board adhesive layer 60 is fixed to the base portion 40. The board adhesive layer 60, the base film layer 61, the copper foil layer 62, and the cover film layer 63 are arranged in the order named.

The board adhesive layer 60 is provided on a lower side (i.e., the −z side) of the base portion 40. The base film layer 61 is provided on the lower side (i.e., the −z side) of the board adhesive layer 60. The copper foil layer 62 is provided on the lower side (i.e., the −z side) of the base film layer 61. The cover film layer 63 is provided on the lower side (i.e., the −z side) of the copper foil layer 62. Each of the base film layer 61 and the cover film layer 63 is preferably made of a resin. Polyimide (PI), for example, is used for each of the base film layer 61 and the cover film layer 63. Note that, there is preferably no portion of the cover film layer 63 provided at each land portion 51. This allows the lead wire 34 to be electrically connected to the copper foil layer 62 at the land portion 51. Note that the term "board adhesive layer" 60 as used herein comprehends not only a glue layer but also, for example, an adhesive layer.

The insulation sheet portion 52 includes a sheet adhesive layer 70 fixed to the base portion 40, and an increased thickness film layer 71 located on the lower side (i.e., the −z side) of the sheet adhesive layer 70. The insulation sheet portion 52 is preferably a portion of the circuit board 50. The insulation sheet portion 52 includes the base film layer 61, the cover film layer 63, and the board adhesive layer 60 as the sheet adhesive layer 70. In the insulation sheet portion 52, the board adhesive layer 60, the base film layer 61, the cover film layer 63, and the increased thickness film layer 71 are arranged in the order named. The above structure allows the board adhesive layer 60, the base film layer 61, and the cover film layer 63 in the insulation sheet portion 52 to be produced by the same process as in production of the circuit board 50. Accordingly, the insulation sheet portion 52 preferably is produced by simple processes. In addition, since the circuit board 50 and the insulation sheet portion 52 is able to be fixed to the base portion 40 at one time, workability is improved. Note that the sheet adhesive layer 70 will be hereinafter referred to as the board adhesive layer 60 because the sheet adhesive layer 70 is preferably the same as the board adhesive layer 60. Also note that, although the increased thickness film layer 71 preferably is a single layer, this is not essential to the present invention. The increased thickness film layer 71 may alternatively be a laminated body defined by a plurality of layers placed one upon another.

The board adhesive layer 60 is provided on the lower side (i.e., the −z side) of the base portion 40. The base film layer 61 is provided on the lower side (i.e., the −z side) of the board adhesive layer 60. The cover film layer 63 is provided on the lower side (i.e., the −z side) of the base film layer 61.

The increased thickness film layer 71 is provided on the lower side (i.e., the −z side) of the cover film layer 63. The increased thickness film layer 71 is preferably made of a resin. For the increased thickness film layer 71 according to a preferred embodiment of the present invention, polyimide (PI), which is preferably used for each of the base film layer 61 and the cover film layer 63 as well, is preferably used, for example. Note that, preferably, no portion of the copper foil layer 62 is located in the insulation sheet portion 52.

The board adhesive layer 60 has a thickness t1. The base film layer 61 has a thickness t2. The copper foil layer 62 has a thickness t3. The cover film layer 63 has a thickness t4. The thickness T1 of the land portion 51 corresponds to a thickness of the circuit board 50 excluding the cover film layer 63. In other words, the thickness T1 of the land portion 51 corresponds to a sum of the thickness t1, the thickness t2, and the thickness t3. The thickness T2 of the insulation sheet portion 52 corresponds to a sum of a thickness of the increased thickness film layer 71 and a thickness of the circuit board 50 excluding the copper foil layer 62. The increased thickness film layer 71 has a thickness t5. That is, the thickness T2 of the insulation sheet portion 52 corresponds to a sum of the thickness t1, the thickness t2, the thickness t4, and the thickness t5.

Specifically, the thickness t5 of the increased thickness film layer 71 is greater than a sum t24 of the thickness t2 of the base film layer 61 and the thickness t4 of the cover film layer 63. Since the increased thickness film layer 71 has a thickness greater than the sum t24 of the thickness t2 of the base film layer 61 and the thickness t4 of the cover film layer 63, the likelihood that a bending of the insulation sheet portion 52 will occur is able to be reduced by a simple structure. The thickness t5 of the increased thickness film layer 71 is preferably about 1.5 or more times the combined thickness t24 of the base film layer and the cover film layer 63. Note that, preferably, the thickness t2 of the base film layer 61 is equal or substantially equal to the thickness t3 of the cover film layer 63. In addition, the thickness t5 of the increased thickness film layer 71 is preferably greater than the thickness t3 of the copper foil layer 62. The thickness t5 of the increased thickness film layer 71 is preferably twice the thickness t3 of the copper foil layer 62 or greater. Note that the thickness t3 of the copper foil layer 62 is greater than the thickness t2 of the base film layer 61. As described above, the thickness T2 of the insulation sheet portion 52 is greater than the thickness T1 of the land portion 51. Note that a gluing agent or an adhesive may be provided between the base film layer 61 and the cover film layer 63. Also note that a gluing agent or an adhesive may be provided between the cover film layer 63 and the increased thickness film layer 71 as well.

Referring to FIG. 3, the lead wire 34 from one of the coils 31 is passed through the base portion through hole 42 to be drawn out below the lower surface 40B of the base portion 40. After being drawn out below the lower surface 40B of the base portion 40, the lead wire 34 is soldered to a corresponding one of the land portions 51, which is positioned away from the base portion through hole 42. When the lead wire 34, after being drawn out, is soldered thereto, the lead wire 34 is pulled in a radial direction (i.e., the y-axis direction) from the base portion through hole 42. As a result of being pulled in the radial direction, the lead wire 34 approaches the inner wall surface of the base portion through hole 42.

The spindle motor 1 includes the insulation sheet portion 52, which covers at least a portion of each base portion through hole 42. The insulation sheet portion 52 contacts the lead wire 34 when the lead wire 34 is pulled in the radial direction. The thickness T2 of the insulation sheet portion 52 is greater than the thickness T1 of the land portion 51. Therefore, the insulation sheet portion 52 bends less easily than the circuit board 50, and is able to support the lead wire 34 being pulled in the radial direction. This contributes to significantly reducing or preventing the likelihood that the lead wire 34 from one of the coils 31, which is passed through the base portion through hole 42, will make contact with the inner wall surface of the base portion through hole 42. This in turn contributes to preventing a short circuit from occurring due to an electrical connection between the lead wire 34 and the inner wall surface of the base portion through hole 42. In addition, a withstand voltage failure is prevented from occurring due to a contact between the lead wire 34 and the inner wall surface of the base portion through hole 42.

In addition, each of the increased thickness film layer 71, the base film layer 61, and the cover film layer 63 is preferably made of a resin. Since all of the base film layer 61, the cover film layer 63, and the increased thickness film layer 71 are made of a resin, each of the base film layer 61, the cover film layer 63, and the increased thickness film layer 71 can be made of the same resin material only by varying the thickness. The base film layer 61, the cover film layer 63, and the increased thickness film layer 71 is thus produced at a lower cost than in the case where the base film layer 61, the cover film layer 63, and the increased thickness film layer 71 are made of different materials.

In addition, referring to FIG. 3, the base portion through hole 42 preferably includes the upper opening portion 44 and the lower opening portion 45. The upper opening portion 44 opens on the upper surface 40A of the base portion 40. The lower opening portion 45 opens on the lower surface 40B of the base portion 40. The opening area of the lower opening portion 45 is greater than the opening area of the upper opening portion 44. This arrangement ensures a sufficient area of a portion of the lower opening portion 45 which is not covered with the insulation sheet portion 52 even when at least a portion of the base portion through hole 42 is covered with the insulation sheet portion 52. This makes it easier to draw out the lead wire 34, and also makes it easier to inject the sealant 43 through the lower opening portion 45.

Note that structures described below may be adopted in other preferred embodiments of the present invention. In the following description, members or portions that have their equivalents in the above-described preferred embodiment are denoted by the same reference numerals as those of their equivalents in the above-described preferred embodiment, and descriptions thereof will be provided in brief or will be omitted.

Although the insulation sheet portion 52 discussed above preferably includes the sheet adhesive layer 70, the base film layer 61, the cover film layer 63, and the increased thickness film layer 71, this is not essential to the present invention. The insulation sheet portion 52 may be modified in various manners as long as the thickness T2 of the insulation sheet portion 52 is greater than the thickness T1 of the land portion 51.

For example, the increased thickness film layer 71 may be provided above the sheet adhesive layer 70 with the base film layer 61 and/or the cover film layer 63 being omitted. When this arrangement is adopted, the increased thickness film layer 71 preferably has a thickness still greater than the thickness t5 illustrated in FIG. 5.

Further, the thickness t2 of the base film layer 61 and/or the thickness t4 of the cover film layer 63 may be increased to define the insulation sheet portion 52. When this configuration is adopted, the increased thickness film layer 71 may be omitted.

Figure 6:
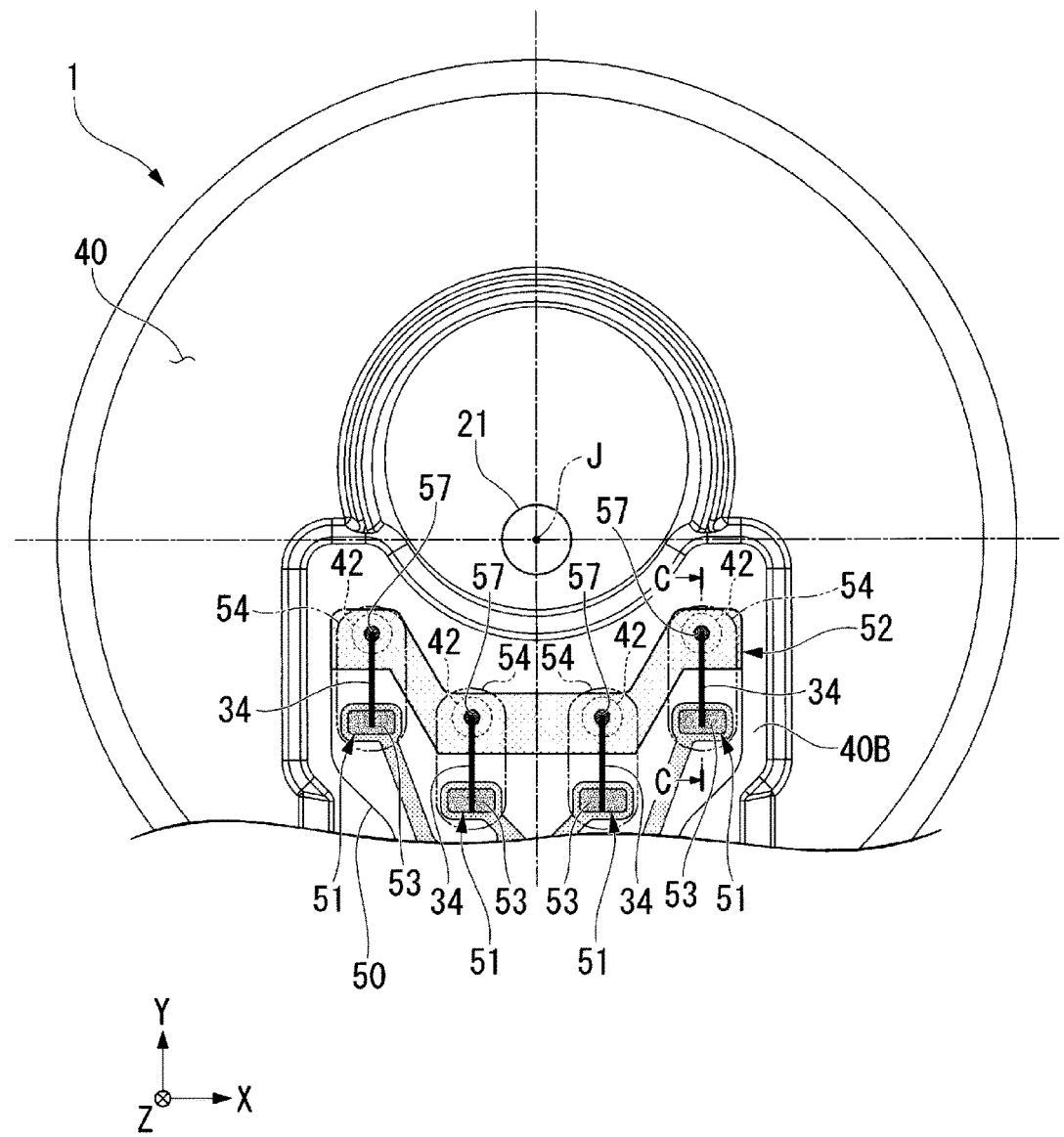
FIG. 6 is a bottom view illustrating a base portion according to an example modification of the above preferred embodiment of the present invention.
Figure 7:
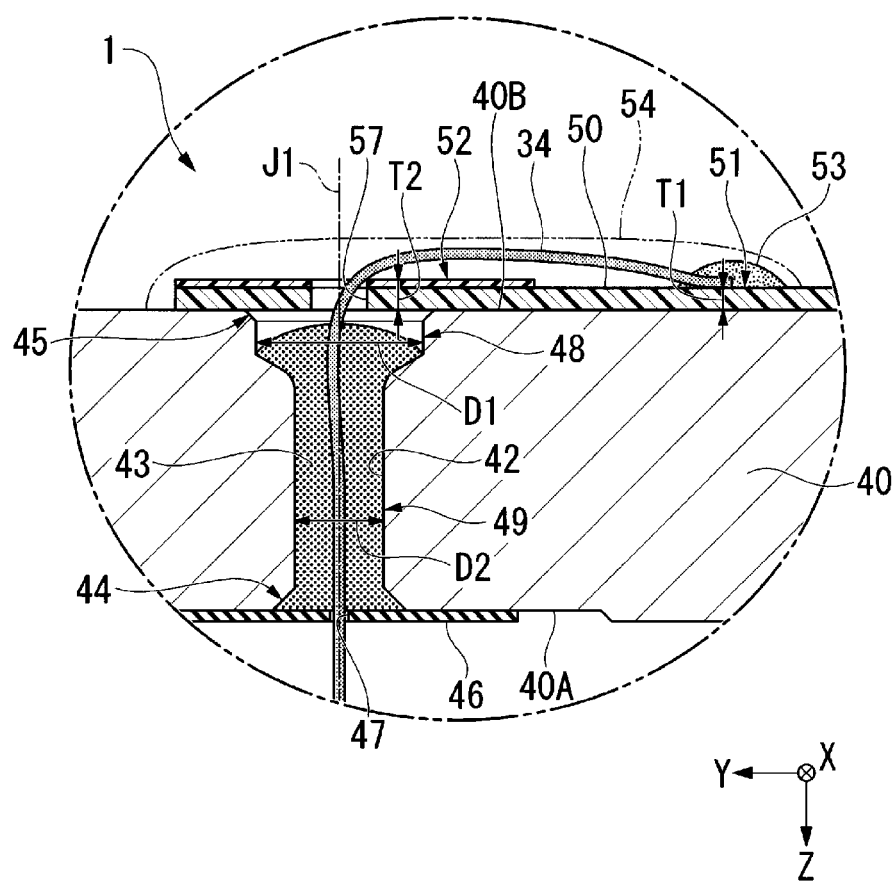
FIG. 7 is a cross-sectional view taken along line C-C in FIG. 6.

FIG. 6 is a bottom view illustrating a base portion 40 according to an example modification of the above-described preferred embodiment of the present invention. FIG. 7 is a cross-sectional view taken along line C-C in FIG. 6.

Referring to FIG. 6, an insulation sheet portion 52 may include sheet portion through holes 57 through each of which a lead wire 34 passes. Each sheet portion through hole 57 overlaps with a corresponding one of base portion through holes 42 in a plan view. The sheet portion through hole 57 preferably has an inside diameter smaller than a second inside diameter D2 of a second opening portion 49. The insulation sheet portion 52 covers almost the entire sheet portion through hole 57.

This arrangement allows the lead wire 34 to be drawn out in a direction parallel or substantially parallel to a central axis J1 without allowing the lead wire 34 to make contact with an inner wall surface of the base portion through hole 42. In addition, referring to FIG. 6, both radial and circumferential movement of the lead wire 34 is restricted. Accordingly, the lead wire 34, which is drawn out below a lower surface 40B of the base portion 40, is able to be positioned accurately with respect to the base portion through hole 42.

Figure 8:
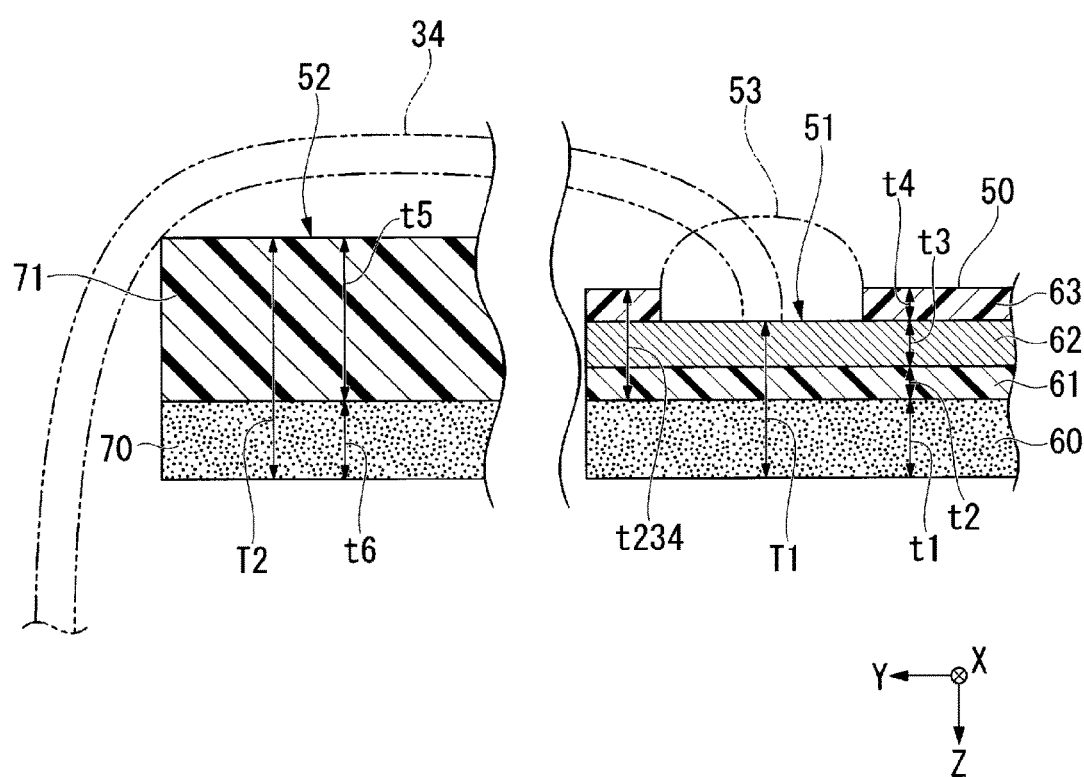
FIG. 8 is a vertical cross-sectional view illustrating an insulation sheet portion according to an example modification of the above preferred embodiment of the present invention.

FIG. 8 is a vertical cross-sectional view illustrating an insulation sheet portion 52 according to an example modification of the above-described preferred embodiment of the present invention.

As illustrated in FIG. 8, the insulation sheet portion 52 may be defined by a member separate from a circuit board 50. The insulation sheet portion 52 includes a sheet adhesive layer 70 which is separate from a board adhesive layer 60, and an increased thickness film layer 71 located on a lower side (i.e., the −z side) of the sheet adhesive layer 70. A thickness t5 of the increased thickness film layer 71 is greater than a combined thickness t234 of a base film layer 61, a copper foil layer 62, and a cover film layer 63. Note that a thickness t6 of the sheet adhesive layer 70 may be equal or substantially equal to a thickness t1 of the board adhesive layer 60.

With the above arrangement, it is possible to make the insulation sheet portion 52 of materials different from those of the circuit board 50. Because of this, it is possible to make the insulation sheet portion 52 of various materials. For example, a resin material used for the increased thickness film layer 71 may be different from a resin material used for the base film layer 61 and the cover film layer 63. Note that, although the increased thickness film layer 71 is preferably a single layer, this is not essential to the present invention. The increased thickness film layer 71 may alternatively be a laminated body defined by a plurality of layers placed one upon another.

Figure 9:
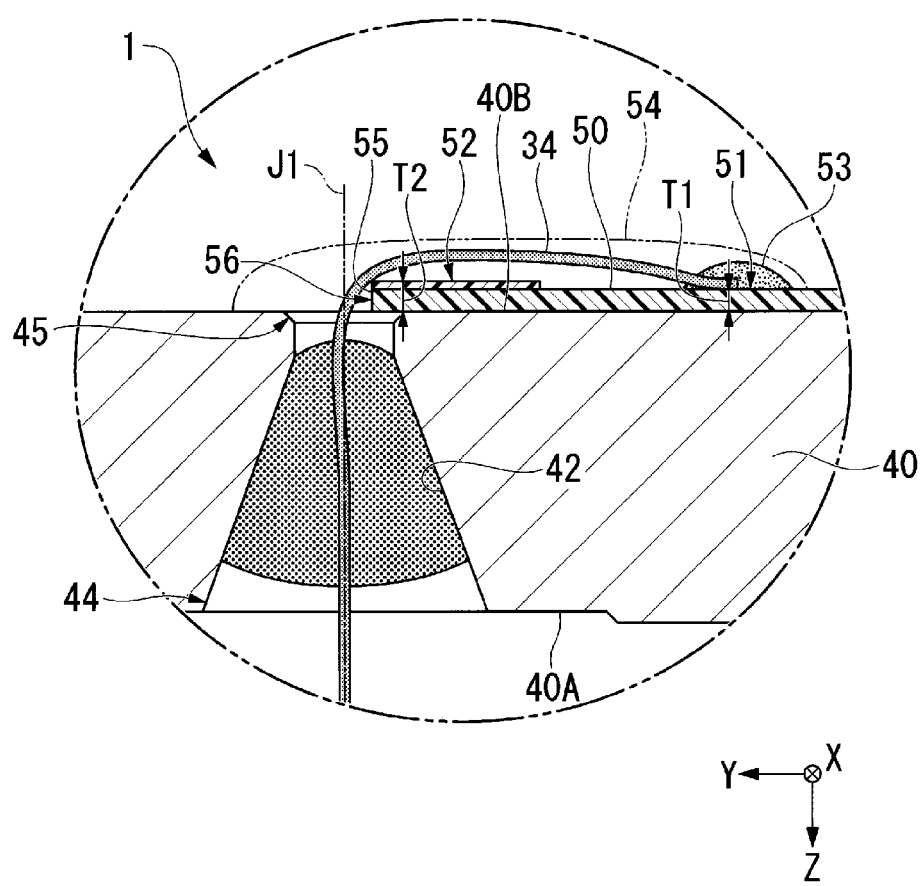
FIG. 9 is a vertical cross-sectional view illustrating an inner wall surface of a base portion through hole according to an example modification of the above preferred embodiment of the present invention.

FIG. 9 is a vertical cross-sectional view illustrating an inner wall surface of a base portion through hole 42 according to an example modification of the above-described preferred embodiment of the present invention.

As illustrated in FIG. 9, the inner wall surface of the base portion through hole 42 may have an angled slanting shape. The inner wall surface of the base portion through hole 42 preferably has a slanting shape that gradually decreases in inside diameter as it extends away from an upper surface 40A toward a lower surface 40B in the axial direction. The slanting shape may be, for example, in the shape of a cone, the shape of a quadrangular pyramid, or the shape of an n-gonal pyramid where n is not four.

According to the above arrangement, an opening area of an upper opening portion 44 is greater than an opening area of a lower opening portion 45.

Note that the insulation sheet portion 52 may alternatively be in close contact with the lead wire 34 such that the base portion through hole 42 is entirely covered therewith.

Also note that the resin material used for the increased thickness film layer 71 may be an elastic elastomer, for example. Also note that the resin material used for the increased thickness film layer 71 may alternatively be a cured plastic, for example.

A structure as described below is preferably included in a preferred embodiment of the present invention.

Figure 10:
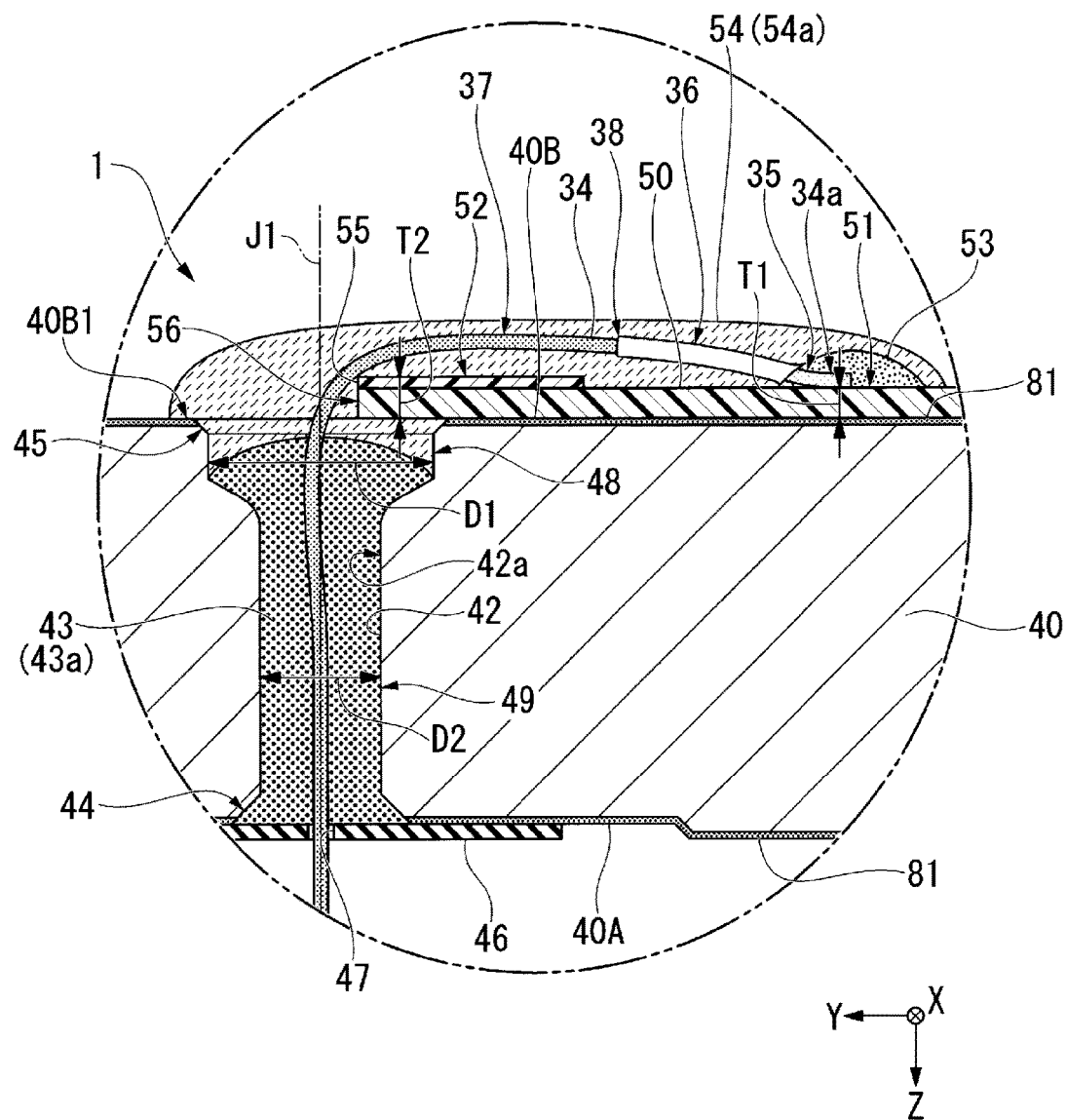
FIG. 10 is a more detailed version of FIG. 3.

FIG. 10 is a more detailed version of FIG. 3.

Referring to FIG. 10, the base portion 40 includes the upper surface 40A, the lower surface 40B, and the base portion through holes 42. The base portion 40 is preferably made of a metal. More specifically, the base portion 40 is preferably made of an aluminum alloy or a ferrous metal. In the case where the base portion 40 is made of the aluminum alloy, the base portion 40 is preferably produced by casting. Meanwhile, in the case where the base portion 40 is made of the ferrous metal, the base portion 40 is preferably produced by press working or casting.

As the aluminum alloy, Japanese Industrial Standards (JIS) ADC12 (which has a coefficient of linear expansion of $21 \times 10^{-6}$ $K^{-1}$), JIS ADC10 (which has a coefficient of linear expansion of $22 \times 10^{-6}$ $K^{-1}$), or the like, for example, is preferably used. As the ferrous metal, JIS SPCC (which has a coefficient of linear expansion of $11.7 \times 10^{-6}$ $K^{-1}$), JIS SPCD, JIS SPCE, JIS SUS303 (which has a coefficient of linear expansion of $17.3 \times 10^{-6}$ $K^{-1}$), JIS SUS304 (which has a coefficient of linear expansion of $17.3 \times 10^{-6}$ $K^{-1}$), or the like, for example, is preferably used.

The base portion 40 includes a coating film 81 which covers a surface of the base portion 40. The coating film 81 has an electrical insulating property. The coating film 81 is preferably an electrodeposition coating layer, for example. An inner wall surface of the base portion 40 which defines each base portion through hole 42 is a metal surface 42a where a metallic surface is exposed. The inner wall surface of the base portion 40 which defines the base portion through hole 42 will be hereinafter referred to as the inner wall surface of the base portion through hole 42. The base portion through hole 42 is preferably defined by a cutting process after the base portion 40 is subjected to electrodeposition coating. Therefore, the inner wall surface of the base portion through hole 42 is not covered with the coating film 81, and the metal surface 42a is exposed thereat.

The sealant 43 is preferably a first sealant 43a arranged in the base portion through hole 42. The first sealant 43a is preferably a thermosetting adhesive. Specifically, the first sealant 43a is preferably an epoxy thermosetting adhesive. Note that the first sealant 43a may alternatively be an anaerobic and/or UV-curing adhesive. Also note that the adhesive of the first sealant 43a may not necessarily be an epoxy adhesive, but may alternatively be, for example, an acrylic adhesive. The first sealant 43a is in contact with the metal surface 42a. More specifically, the first sealant 43a is in contact with both the metal surface 42a and the lead wire 34, and is also located between the metal surface 42a and the lead wire 34. A contact of the first sealant 43a with the metal surface 42a contributes to preventing a contact between the lead wire 34 and the metal surface 42a.

The molding member 54 is preferably a second sealant 54a covering at least a portion of the base portion through hole 42. The second sealant 54a is preferably a thermosetting adhesive. Specifically, the second sealant 54a is an epoxy thermosetting adhesive. Note that the second sealant 54a may be ultraviolet curable. A coefficient of linear expansion of the second sealant 54a is preferably in the range of about $40 \times 10^{-6}$ $K^{-1}$ to about $85 \times 10^{-6}$ $K^{-1}$, and more specifically, in the range of about $60 \times 10^{-6}$ $K^{-1}$ to about $80 \times 10^{\times 6}$ $K^{\times 1}$, for example.

Meanwhile, a coefficient of linear expansion of the first sealant 43a is preferably in the range of about $25 \times 10^{-6}$ $K^{-1}$ to about $35 \times 10^{-6}$ $K^{-1}$, and more specifically, in the range of about $28 \times 10^{-6}$ $K^{-1}$ to about $32 \times 10^{-6}$ $K^{-1}$, for example. That is, the coefficient of linear expansion of the first sealant 43a preferably is greater than the coefficient of linear expansion of the base portion 40 and smaller than the coefficient of linear expansion of the second sealant 54a. If an operating temperature of the spindle motor 1 increases while the spindle motor 1 is rotating, the first sealant 43a expands and becomes more closely adhered to the base portion through hole 42. This contributes to preventing gas from entering or exiting through the base portion through hole 42.

The first sealant 43a expands less than the second sealant 54a. Therefore, a thermal stress which occurs in the first sealant 43a is preferably small. This reduces the likelihood that any cracks will appear in the first sealant 43a, and also the likelihood that the first sealant 43a will come off the inner wall surface of the base portion through hole 42. Note that, because the second sealant 54a is able to expand away from the base portion through hole 42, a thermal stress which occurs in the second sealant 54a is small. This significantly reduces or prevented the likelihood that any cracks will appear in the second sealant 54a, and also the likelihood that the second sealant 54a will come off the surface of the base portion 40.

A difference in the coefficient of linear expansion between the first sealant 43a and the base portion 40 is preferably about $10 \times 10^{-6}$ $K^{-1}$ or less, for example. When the coefficient of linear expansion of the first sealant 43a is close to the coefficient of linear expansion of the metallic base portion 40, expansion of the first sealant 43a follows expansion of the base portion 40. This significantly reduces or prevents the likelihood that a crack or the like will appear in the cured first sealant 43a, and also the likelihood that the cured first sealant 43a will come off the inner wall surface of the base portion through hole 42.

The base portion 40 is preferably an aluminum alloy casting. As mentioned above, the coefficient of linear expansion of the first sealant 43a is preferably in the range of about $25 \times 10^{-6}$ $K^{-1}$ to about $35 \times 10^{-6}$ $K^{-1}$, for example. Further, the coefficient of linear expansion of the aluminum alloy is preferably in the range of about $21 \times 10^{-6}$ $K^{-1}$ to about $22 \times 10^{-6}$ $K^{-1}$, for example. Furthermore, the coefficient of linear expansion of the ferrous metal is preferably in the range of about $11.7 \times 10^{-6}$ $K^{-1}$ to about $17.3 \times 10^{-6}$ $K^{-1}$, for example. Therefore, the coefficient of linear expansion of the aluminum alloy is closer to the coefficient of linear expansion of the first sealant 43a than is the coefficient of linear expansion of the ferrous metal.

The second sealant 54a covers the edge 55 of the insulation sheet portion 52 and the entire base portion through hole 42. The edge 55 is outward of the central axis J1 of the base portion through hole 42. The second sealant 54a is in contact with an upper surface, a lower surface, and an end surface of the edge 55. In addition, the second sealant 54a covers the entire lower opening portion 45. The base portion through hole 42 is sealed with the first sealant 43a and the second sealant 54a. This contributes to preventing gas from entering or exiting through the base portion through hole 42. Moreover, gas is prevented from entering or exiting through a gap between the lead wire 34 and the edge 55.

In addition, the second sealant 54a is in contact with both the inner wall surface of the base portion through hole 42 and the first sealant 43a. Specifically, the second sealant 54a is in contact with both the inner wall surface of the first opening portion 48 and the inner wall surface of the lower opening portion 45. Moreover, the second sealant 54a is in contact with a lower portion of the first sealant 43a. Thus, because the base portion through hole 42 is sealed with the second sealant 54a as well as with the first sealant 43a, gas is more effectively preventing from entering or existing through the base portion through hole 42.

Referring to FIG. 2, the base portion through hole 42, the insulation sheet portion 52, and the land portion 51 are arranged in the order named such that the base portion through hole 42 is the closest to the central axis J and the land portion 51 is the most distant from the central axis J. More specifically, the base portion through hole 42, the insulation sheet portion 52, and the land portion 51 are arranged in the order named along a direction parallel or substantially parallel to the y-axis direction such that the base portion through hole 42 is the closest to the central axis J and the land portion 51 is the most distant from the central axis J toward the −y side. Referring to FIG. 10, the second sealant 54a is in contact with a lower surface 40B1, which is a portion of the lower surface 40B on a side of the base portion through hole 42 closer to the central axis J. This contributes to preventing gas from entering or existing into and from the base portion through hole 42 through the lower surface 40B1 on which no portion of the insulation sheet portion 52 is provided.

The second sealant 54a covers both the lead wire 34 and the land portion 51. This prevents gas from entering or exiting through a gap between the lead wire 34 and the circuit board 50. Referring to FIG. 2, the coils 31 include the plurality of lead wires 34. The base portion 40 preferably includes the plurality of base portion through holes 42, and one of the lead wires 34 passes through each one of the base portion through holes 42. The second sealant 54a which defines each molding member 54 covers one of the plurality of lead wires 34 individually. With this arrangement, a volume of each one of the second sealants 54a is reduced, and when heat is applied to the second sealant 54a to cure the second sealant 54a, any air bubbles within the second sealant 54a are able to easily escape out of the second sealant 54a through a surface of the second sealant 54a. As a result, airtightness of the second sealant 54a is improved. Moreover, any gas which exists in a space defined by the circuit board 50, the lower portion of the first sealant 43a, the inner wall surface of the first opening portion 48, and the inner wall surface of the lower opening portion 45 is able to easily escape out of the space through a gap between two adjacent ones of the second sealants 54a. As a result, the gas is easily replaced with the second sealant 54a in the aforementioned space, so that quality of the sealing of the base portion through hole 42 is improved.

Referring to FIG. 10, the lead wire 34 preferably includes a conducting wire 35, a solder film 36, and an insulating coating 37. The solder film 36 is defined during a process of soldering the lead wire 34, for example. In the process of soldering the lead wire 34, the lead wire 34 is first drawn out from an end portion of one of the coils 31. Next, a portion of the lead wire 34 which has been drawn out is dipped in a molten liquid solder. A portion of the insulating coating 37 which has been dipped in the liquid solder is melted to expose the conducting wire 35. Once the conducting wire 35 is pulled out of the liquid solder, a liquid solder attached to the conducting wire 35 is cured to define the solder film 36.

One end portion 34a of the conducting wire 35 is connected to the land portion 51 through the solder 53. A portion of the solder film 36 preferably defines the solder 53. The solder film 36 extends from the solder 53 toward an opposite end portion 34b of the conducting wire 35 while covering a portion of the conducting wire 35. Referring to FIG. 1, the opposite end portion 34b is located above the upper surface 40A of the base portion 40. On the other hand, the one end portion 34a is located below the lower surface 40B of the base portion 40. The insulating coating 37 extends from the solder film 36 toward the opposite end portion 34b of the conducting wire 35 while covering a portion of the conducting wire 35.

Referring to FIG. 10, a boundary 38 between the solder film 36 and the insulating coating 37 is preferably positioned between the base portion through hole 42 and the land portion 51. That is, the solder film 36 is arranged outward of the base portion through hole 42. The solder film 36 has electrical conductivity. If the solder film were positioned at the base portion through hole, the solder film and the inner wall surface of the base portion through hole might make contact with each other, and the lead wire and the base portion might become electrically connected with each other to cause a short circuit. Arranging the boundary 38 between the solder film 36 and the insulating coating 37 at a position between the base portion through hole 42 and the land portion 51 preferably prevents the solder film 36 from being located at the base portion through hole 42. Moreover, it is possible to recognize that the solder film 36 is outward of the base portion through hole 42 through visual inspection.

Note that structures described below may be adopted in preferred embodiments of the present invention. In the following description, members or portions that have their equivalents in the above-described preferred embodiment are denoted by the same reference numerals as those of their equivalents in the above-described preferred embodiment, and descriptions thereof will be provided in brief or will be omitted.

Figure 11:
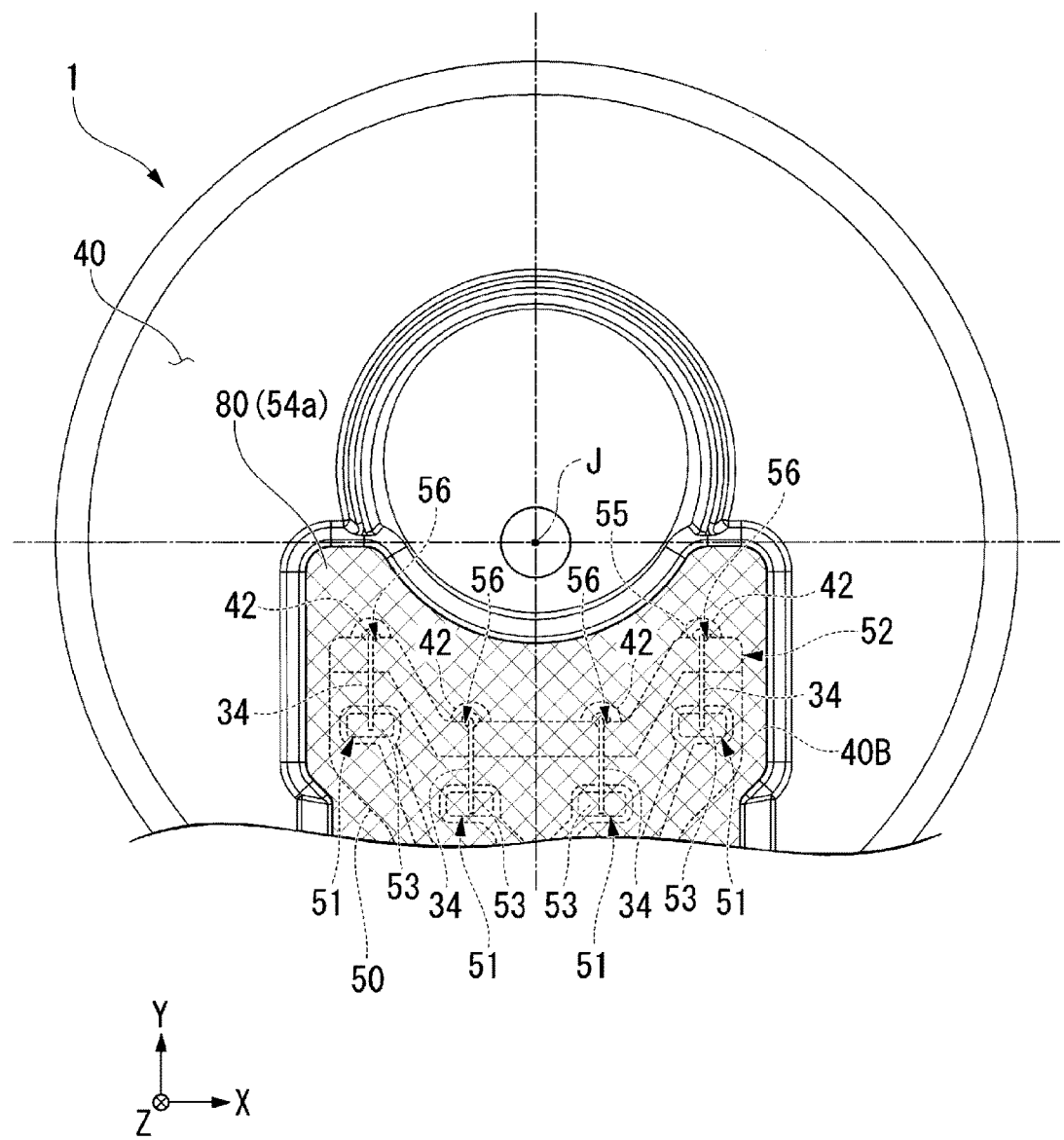
FIG. 11 is a bottom view illustrating a second sealant according to an example modification of the above preferred embodiment of the present invention.

FIG. 11 is a bottom view illustrating a second sealant 54a according to an example modification of a preferred embodiment of the present invention.

Referring to FIG. 11, the second sealant 54a may be a thermosetting sheet member 80. The second sealant 54a is preferably configured to singly cover all of a plurality of lead wires 34. The sheet member 80 is preferably, for example, a sealing sheet made of a thermosetting resin material. Once the sheet member 80 is heated, the sheet member 80 is closely adhered to the plurality of lead wires 34, a lower surface 40B of a base portion 40, a circuit board 50, land portions 51, an insulation sheet portion 52, and so on, and is cured. The above structure makes it possible to cover the plurality of lead wires 34 with the one second sealant 54a, achieving improved workability.

Figure 12:
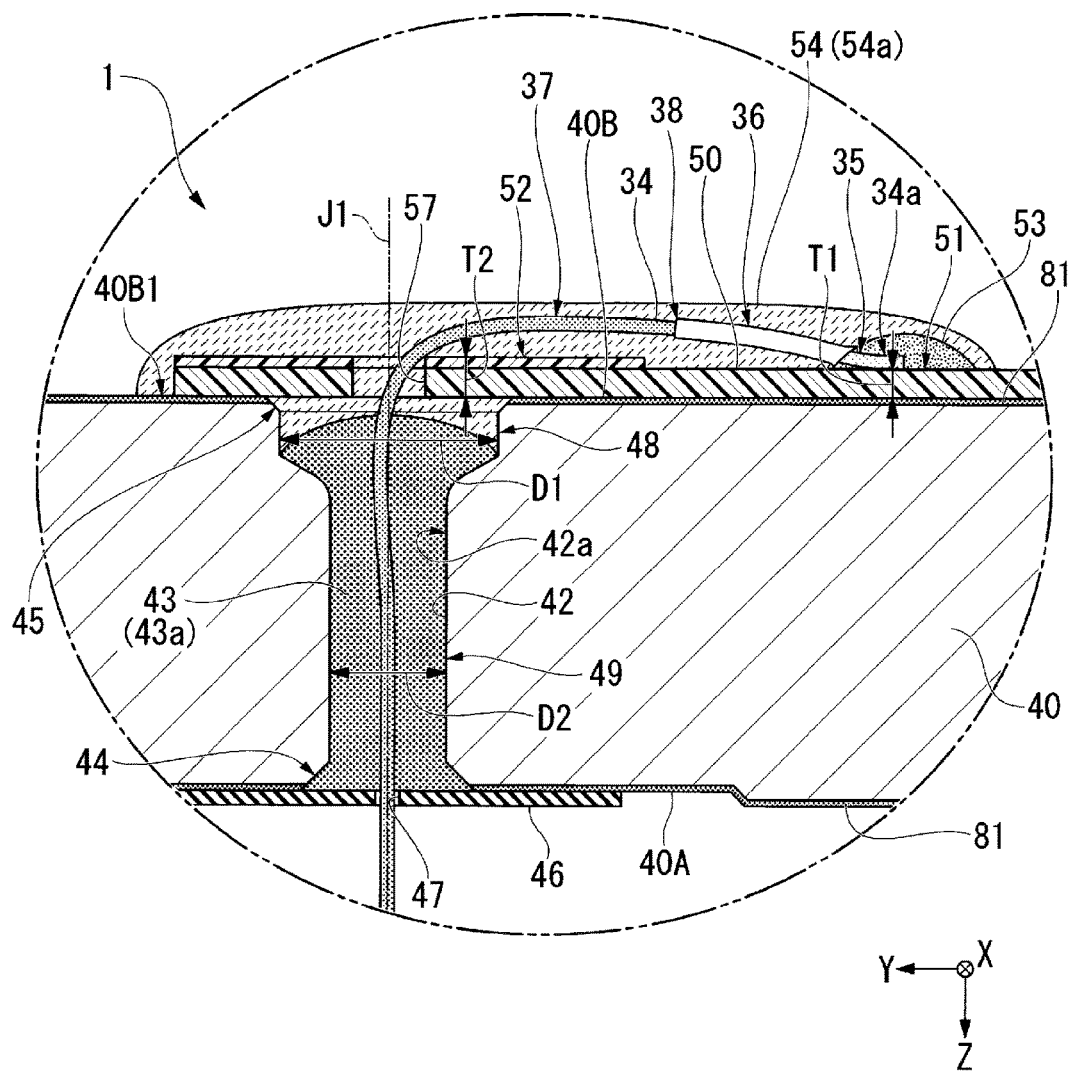
FIG. 12 is a vertical cross-sectional view illustrating a second sealant according to an example modification of the above preferred embodiment of the present invention.

FIG. 12 is a vertical cross-sectional view illustrating a second sealant 54a according to an example modification of a preferred embodiment of the present invention.

Referring to FIG. 12, the second sealant 54a may be provided in contact with an inner wall surface of an insulation sheet portion 52 which defines a sheet portion through hole 57. Further, the second sealant 54a is in contact with an upper surface and a lower surface of the insulation sheet portion 52. Moreover, the second sealant 54a is in contact with an inner wall surface of a base portion through hole 42 and a first sealant 43a. The above structure preferably prevents gas from entering or exiting through a gap between a lead wire 34 and the insulation sheet portion 52.

Note that the thermosetting sheet member may not necessarily be one in number, but two or more thermosetting sheet members may alternatively be provided in a modification of the example modification of FIG. 11. For example, each one of the base portion through holes may be covered with one separate sheet member. Also, two of the base portion through holes may be covered with one sheet member.

Also note that the second sealant may not necessarily be an adhesive or a sheet member, but may alternatively be another sealant.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a rotor portion including a rotor magnet;
   a bearing portion configured to support the rotor portion such that the rotor portion is rotatable about a central axis extending in a vertical direction;
   a base portion made of a metal, and including an upper surface, a lower surface, and a base portion through hole passing therethrough from the upper surface to the lower surface;
   a stator portion located on the upper surface, and including coils arranged opposite to the rotor magnet with a gap intervening therebetween;
   a circuit board located on the lower surface;
   an insulation sheet portion;
   a first sealant; and
   a second sealant; wherein
   the coils include a lead wire drawn out from above the upper surface downwardly from the lower surface through the base portion through hole;
   the circuit board includes a land portion to which the lead wire is connected;
   the insulation sheet portion is provided on the lower surface, and covers at least a portion of the base portion through hole;
   the lead wire contacts the insulation sheet portion;
   the first sealant is located in the base portion through hole;
   the second sealant covers at least a portion of the base portion through hole; and
   the first sealant has a coefficient of linear expansion greater than a coefficient of linear expansion of the base portion and smaller than a coefficient of linear expansion of the second sealant.

2. The spindle motor according to claim 1, wherein
   the first sealant is a thermosetting adhesive; and
   a difference in the coefficient of linear expansion between the first sealant and the base portion is about $10 \times 10^{-6}$ $K^{-1}$ or less.

3. The spindle motor according to claim 2, wherein the base portion is an aluminum alloy casting.

4. The spindle motor according to claim 2, wherein
   the base portion through hole, the insulation sheet portion, and the land portion are arranged in the order named such that the base portion through hole is a closest to the central axis and the land portion is a most distant from the central axis;
   the insulation sheet portion includes an edge which covers at least a portion of the base portion through hole, and is located at a center of the base portion through hole or outward of the center of the base portion through hole; and
   the second sealant covers the edge of the insulation sheet portion and the entire base portion through hole.

5. The spindle motor according to claim 1, wherein
   the base portion through hole, the insulation sheet portion, and the land portion are arranged in the order named such that the base portion through hole is a closest to the central axis and the land portion is a most distant from the central axis;
   the insulation sheet portion includes an edge which covers at least a portion of the base portion through hole, and is located at a center of the base portion through hole or outward of the center of the base portion through hole; and
   the second sealant covers the edge of the insulation sheet portion and the entire base portion through hole.

6. The spindle motor according to claim 5, wherein the second sealant contacts the first sealant and an inner wall surface of the base portion which defines the base portion through hole.

7. The spindle motor according to claim 6, wherein the second sealant contacts a portion of the lower surface on a side of the base portion through hole closer to the central axis.

8. The spindle motor according to claim 5, wherein the second sealant is in contact with a portion of the lower surface on a side of the base portion through hole closer to the central axis.

9. The spindle motor according to claim 1, wherein the second sealant covers both the lead wire and the land portion.

10. The spindle motor according to claim 1, wherein
    the coils include a plurality of lead wires;
    the base portion includes a plurality of base portion through holes; and
    one of the lead wires passes through each one of the base portion through holes.

11. The spindle motor according to claim 10, wherein
    the second sealant is a thermosetting adhesive; and
    the second sealant covers each one of the plurality of lead wires individually.

12. The spindle motor according to claim 10, wherein
    the second sealant is a thermosetting sheet member; and
    the second sealant singly covers all of the plurality of lead wires.

13. The spindle motor according to claim 1, wherein
    the land portion is located at a position spaced away from the base portion through hole in a radial direction;
    the lead wire includes:
        a conducting wire including one end portion connected to the land portion through a solder;
        a solder film which extends from the solder toward an opposite end portion of the conducting wire while covering a portion of the conducting wire; and
        an insulating coating which extends from the solder film toward the opposite end portion of the conducting wire while covering a portion of the conducting wire; and a boundary between the solder film and the insulating coating is positioned between the base portion through hole and the land portion.

14. The spindle motor according to claim 1, wherein the base portion includes a coating film which covers a surface of the base portion;

an inner wall surface of the base portion which defines the base portion through hole is a metal surface where a metallic surface is exposed; and the first sealant is in contact with the metal surface.

15. A disk drive apparatus comprising:

the spindle motor according to claim 1;

a disk supported by the spindle motor; and an access portion configured to perform at least one of reading and writing of information from or to the disk.

* * * * *